US012769768B2

(12) United States Patent
Otsuka et al.

(10) Patent No.: US 12,769,768 B2
(45) Date of Patent: Oct. 20, 2026

(54) DATA COLLECTION APPARATUS, DATA COLLECTION METHOD, AND PROGRAM

(71) Applicant: NTT, Inc., Tokyo (JP)

(72) Inventors: Atsushi Otsuka, Tokyo (JP); Narichika Nomoto, Tokyo (JP); Shiro Ozawa, Tokyo (JP)

(73) Assignee: NTT, Inc., Tokyo (JP)

( * ) Notice: Subject to any disclaimer, the term of this patent is extended or adjusted under 35 U.S.C. 154(b) by 196 days.

(21) Appl. No.: 18/576,714

(22) PCT Filed: Jul. 8, 2021

(86) PCT No.: PCT/JP2021/025815

§ 371 (c)(1),
(2) Date: Jan. 4, 2024

(87) PCT Pub. No.: WO2023/281707

PCT Pub. Date: Jan. 12, 2023

(65) Prior Publication Data

US 2025/0094453 A1 Mar. 20, 2025

(51) Int. Cl.
*G06F 16/3329* (2025.01)
*G06F 16/176* (2019.01)
*G06V 30/148* (2022.01)

(52) U.S. Cl.
CPC ........ *G06F 16/3329* (2019.01); *G06F 16/176* (2019.01); *G06V 30/153* (2022.01)

(58) Field of Classification Search
None
See application file for complete search history.

(56) References Cited

U.S. PATENT DOCUMENTS 11,256,995 B1 * 2/2022 Bucher et al. ......... G06N 5/022
11,494,512 B2 * 11/2022 Sarferaz .............. G06F 21/6227
11,574,121 B2 * 2/2023 Bhat et al. ............... G06N 3/08
2022/0138267 A1 5/2022 Otsuka et al.

FOREIGN PATENT DOCUMENTS

CN 111857942 A * 10/2020 ........... G06F 9/5027
JP 2020135457 A 8/2020

OTHER PUBLICATIONS

Li, "Apache Tika: Whatis it and why should I use it?", Jun. 14, 2019.*
He, Translation of CN111857942A, Oct. 30, 2020.*
Nakawatase et al. (2001) "Web Publishing and Portal Site System Based on Author's Control" Information Processing Society Research Report, vol. 2001, No. 107, pp. 77-82.

* cited by examiner

*Primary Examiner* — Paras D Shah
*Assistant Examiner* — Nicholas D Lowen

(57) ABSTRACT

A data collection device according to an embodiment includes: an acquisition unit that acquires data when the data is stored in a shared storage area available to one or more users; a determination unit that determines whether or not a format of the data acquired by the acquisition unit is a format in which text included in the data can be extracted by a predetermined library; an extraction unit that extracts the text included in the data by a text extraction method according to a determination result determined by the determination unit; and a storage unit that stores the text extracted by the extraction unit in a database as learning data for a machine learning model that implements a natural language processing task.

9 Claims, 7 Drawing Sheets

Fig. 5

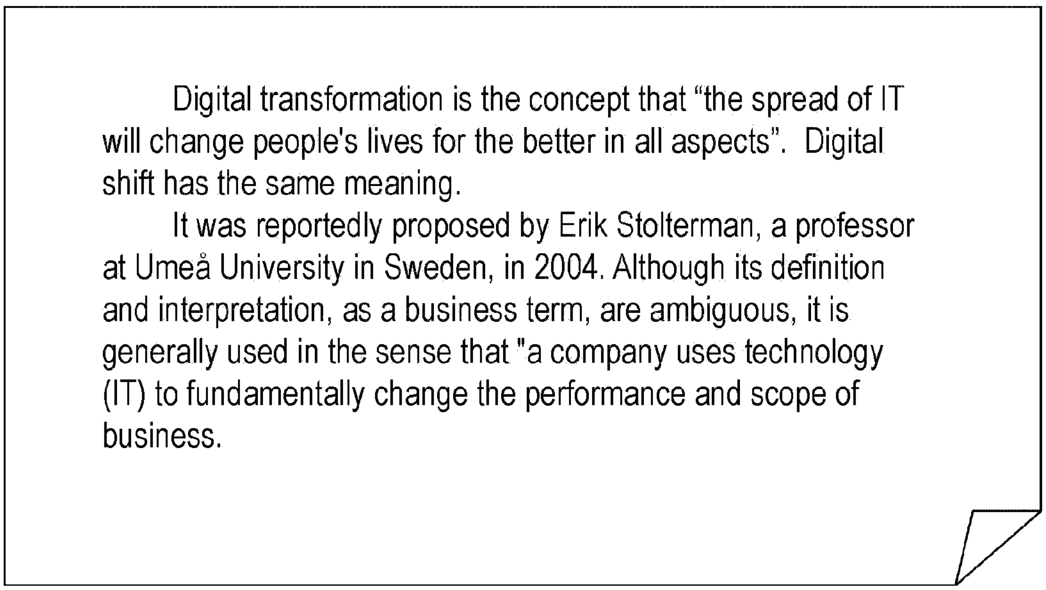

Digital transformation is the concept that “the spread of IT will change people's lives for the better in all aspects”. Digital shift has the same meaning.

It was reportedly proposed by Erik Stolterman, a professor at Umeå University in Sweden, in 2004. Although its definition and interpretation, as a business term, are ambiguous, it is generally used in the sense that "a company uses technology (IT) to fundamentally change the performance and scope of business.

dx.doc poster.pdf

Fig. 7

| FILE NAME | No. | FILE OWNER | UPDATED DATE AND TIME | TEXT DATA |
|---|---|---|---|---|
| dx.doc | 1 | user1 | 2020/3/1 | Digital transformation is the concept that "the spread of IT will change people's lives for the better in all aspects". Digital shift has the same meaning. |
| dx.doc | 2 | user1 | 2020/3/1 | It was reportedly proposed by Erik Stolterman ... |
| poster.pdf | 1 | user1 | 2020/3/10 | Notice of tour<br>The tour will be held as usual ... |

DATA COLLECTION APPARATUS, DATA COLLECTION METHOD, AND PROGRAM

CROSS-REFERENCE TO RELATED APPLICATIONS

This application is a U.S. 371 Application of International Patent Application No. PCT/JP2021/025815, filed on 8 Jul. 2021, the disclosure of which is hereby incorporated herein by reference in its entirety.

TECHNICAL FIELD

The present invention relates to a data collection device, a data collection method, and a program.

BACKGROUND ART

In recent years, with the development of machine learning techniques, many machine learning-based devices including natural language processing have been developed (for example, Patent Literature 1).

CITATION LIST

Patent Literature

Patent Literature 1: JP 2020-135457 A

SUMMARY OF INVENTION

Technical Problem

However, in the machine learning techniques, a large amount of data (learning data) is required for model learning, and there is a problem that it is generally difficult to collect the data.

For example, in a case where learning data is collected from actual data such as an email, a dedicated logger or the like is required, an installation cost thereof is incurred, and setting is often difficult from the viewpoint of security, privacy, and the like. For this reason, in many cases, the learning data is manually created, but in that case, the creation cost of the data becomes enormous, and there may be a deviation between the pseudo data created manually and the actual data.

An embodiment of the present invention has been made in view of the above points, and an object thereof is to enable easy collection of learning data.

Solution to Problem

In order to achieve the above object, a data collection device according to an embodiment includes: an acquisition unit that acquires data when the data is stored in a shared storage area available to one or more users; a determination unit that determines whether or not a format of the data acquired by the acquisition unit is a format in which text included in the data is extractable by a predetermined library; an extraction unit that extracts the text included in the data by a text extraction method according to a determination result determined by the determination unit; and a storage unit that stores the text extracted by the extraction unit in a database as learning data for a machine learning model that implements a natural language processing task.

Advantageous Effects of Invention

Learning data can be easily collected.

BRIEF DESCRIPTION OF DRAWINGS

FIG. 5 is a diagram illustrating an example of a document file.

FIG. 7 is a diagram illustrating an example of a text data DB.

DESCRIPTION OF EMBODIMENTS

An embodiment of the present invention will be described below. In the present embodiment, a data collection system 1 capable of easily collecting learning data for a machine learning model that implements a natural language processing task (for example, machine reading and the like) from actual data will be described. Here, the actual data is data (for example, a document file, an image file, an email, or the like) used in actual business or the like. Hereinafter, the document file, the image file, the email, and the like are also collectively referred to simply as a "file".

The data collection system 1 according to the present embodiment extracts text from various files such as document files and collects the text as learning data. At this time, the data collection system 1 according to the present embodiment cooperates with a shared folder used for business or the like, and automatically extracts text from a file stored in the shared folder. In addition, at the time of this text extraction, the format of the file is determined, and the text is extracted by a method suitable for the file format.

However, the shared folder is an example, and the present embodiment is not limited to the shared folder, and is similarly applicable to a shared storage area in which various files are stored.

<Overall Configuration of Data Collection System 1>

Figure 1:
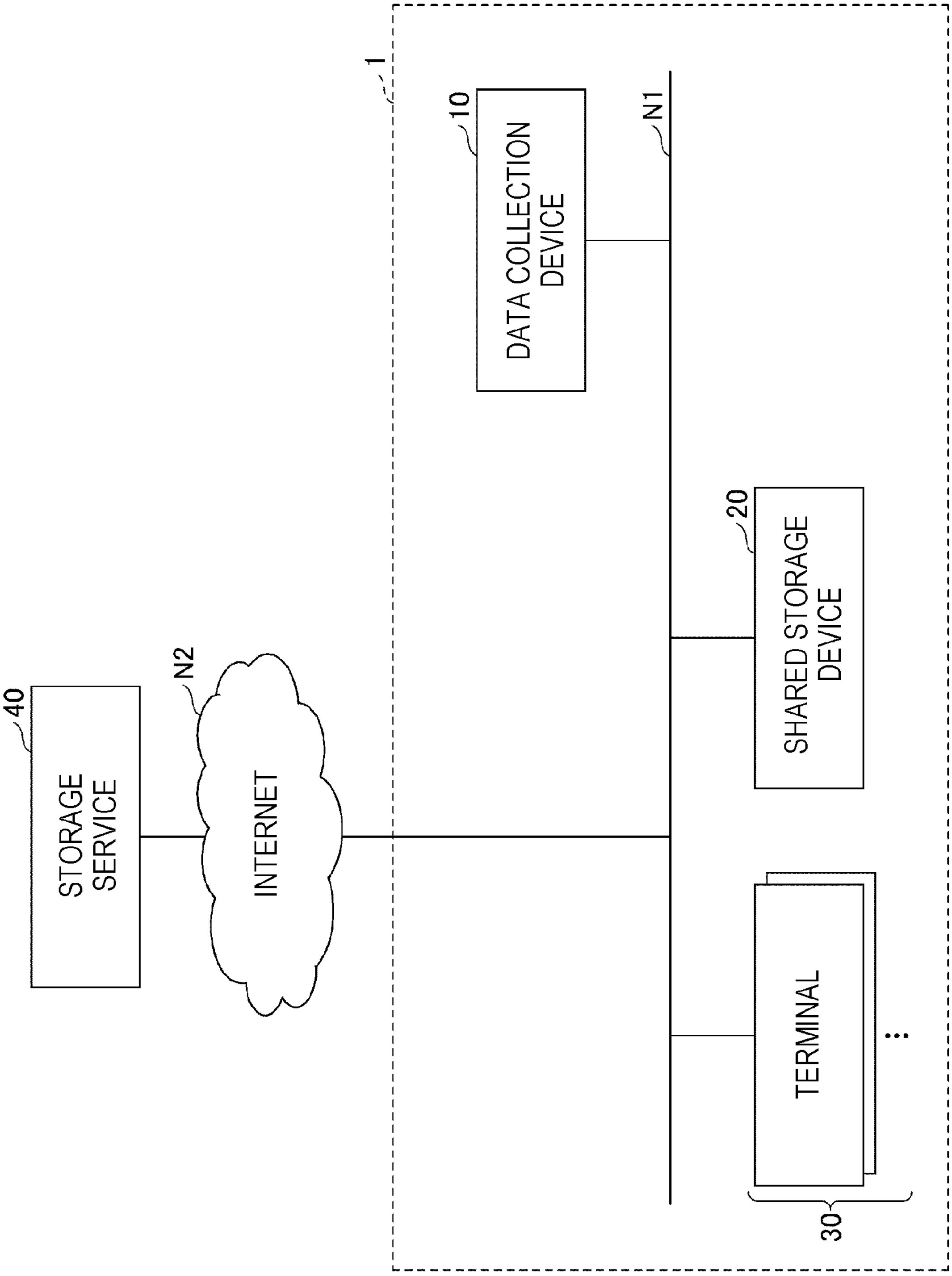
FIG. 1 is a diagram illustrating an example of an overall configuration of a data collection system according to the present embodiment.

FIG. 1 illustrates an overall configuration of the data collection system 1 according to the present embodiment. As illustrated in FIG. 1, the data collection system 1 according to the present embodiment includes a data collection device 10, a shared storage device 20, and one or more terminals 30. The data collection device 10, the shared storage device 20, and each terminal 30 are communicatively connected via a local area network N1.

In addition, the data collection system 1 according to the present embodiment is communicatively connected to a storage service 40 via the Internet N2.

The data collection device 10 extracts text from a file stored in a shared folder of the shared storage device 20 or the storage service 40, and collects the text as learning data.

The shared storage device 20 is a storage device in the local area network N1, and has a shared folder to which a file can be uploaded from each terminal 30.

The terminals 30 are various terminals used by a user who uploads a file to a shared folder. Note that, as the terminal 30, for example, a personal computer (PC), a smartphone, a tablet terminal, a wearable device, or the like can be used.

The storage service 40 is a storage device outside the data collection system 1, and has a shared folder to which a file can be uploaded from each terminal 30.

Note that the configuration of the data collection system 1 illustrated in FIG. 1 is an example, and other configurations may be used. For example, some or all of the one or more terminals 30 may exist outside the data collection system 1 and may be communicatively connected to the data collection system 1 via the Internet N2. In addition, a plurality of shared storage devices 20 may exist, and similarly, a plurality of storage services 40 may exist. In addition, both the shared storage device 20 and the storage service 40 do not necessarily exist, and only one of the shared storage device 20 and the storage service 40 may exist.

<Hardware Configuration of Data Collection Device 10>

Figure 2:
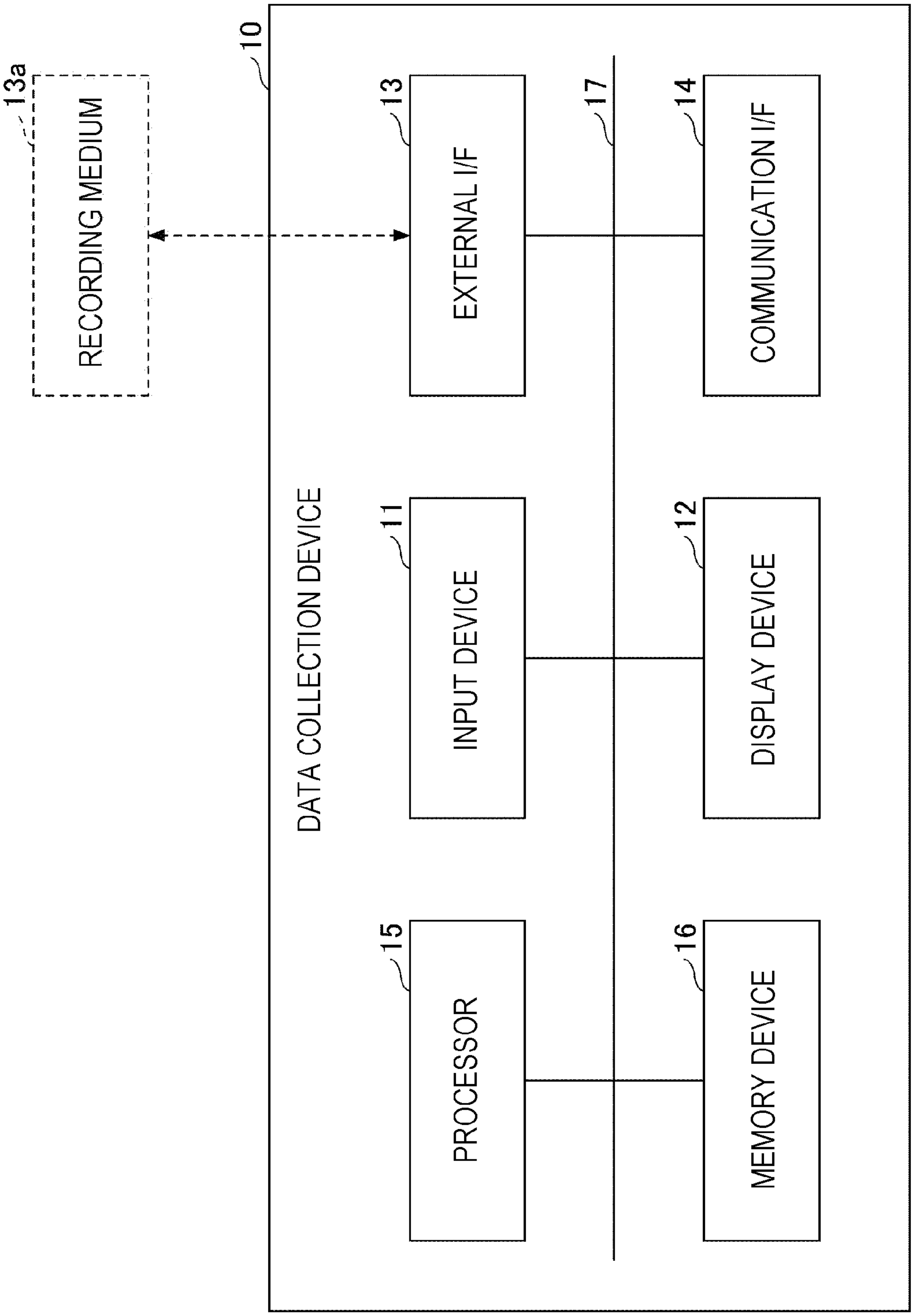
FIG. 2 is a diagram illustrating an example of a hardware configuration of a data collection device according to the present embodiment.

FIG. 2 illustrates a hardware configuration of the data collection device 10 according to the present embodiment. As illustrated in FIG. 2, the data collection device 10 according to the present embodiment includes an input device 11, a display device 12, an external I/F 13, a communication I/F 14, a processor 15, and a memory device 16. These hardware configurations are communicatively connected to each other via a bus 17.

The input device 11 is, for example, a keyboard, a mouse, a touch panel, various buttons, or the like. The display device 12 is, for example, a display, a display panel, or the like. Note that the data collection device 10 may not include at least one of the input device 11 or the display device 12.

The external I/F 13 is an interface with an external device such as a recording medium 13*a*. The data collection device 10 can perform reading, writing, etc. of the recording medium 13*a* via the external I/F 13. Note that examples of the recording medium 13*a* include a compact disc (CD), a digital versatile disk (DVD), a secure digital memory card (SD memory card), a Universal Serial Bus (USB) memory card, and the like.

The communication I/F 14 is an interface for connecting the data collection device 10 to the local area network N1 or the like. The processor 15 is, for example, one of various arithmetic devices such as a central processing unit (CPU) and a graphics processing unit (GPU). The memory device 16 is, for example, any of various storage devices such as a hard disk drive (HDD), a solid state drive (SSD), a random access memory (RAM), a read only memory (ROM), and a flash memory.

Since the data collection device 10 according to the present embodiment has the hardware configuration illustrated in FIG. 2, it is possible to implement data collection processing which will be described later. Note that the hardware configuration illustrated in FIG. 2 is an example, and the data collection device 10 may include, for example, a plurality of processors 15, a plurality of memory devices 16, or other various hardware configurations.

<Functional Configuration of Data Collection Device 10>

Figure 3:
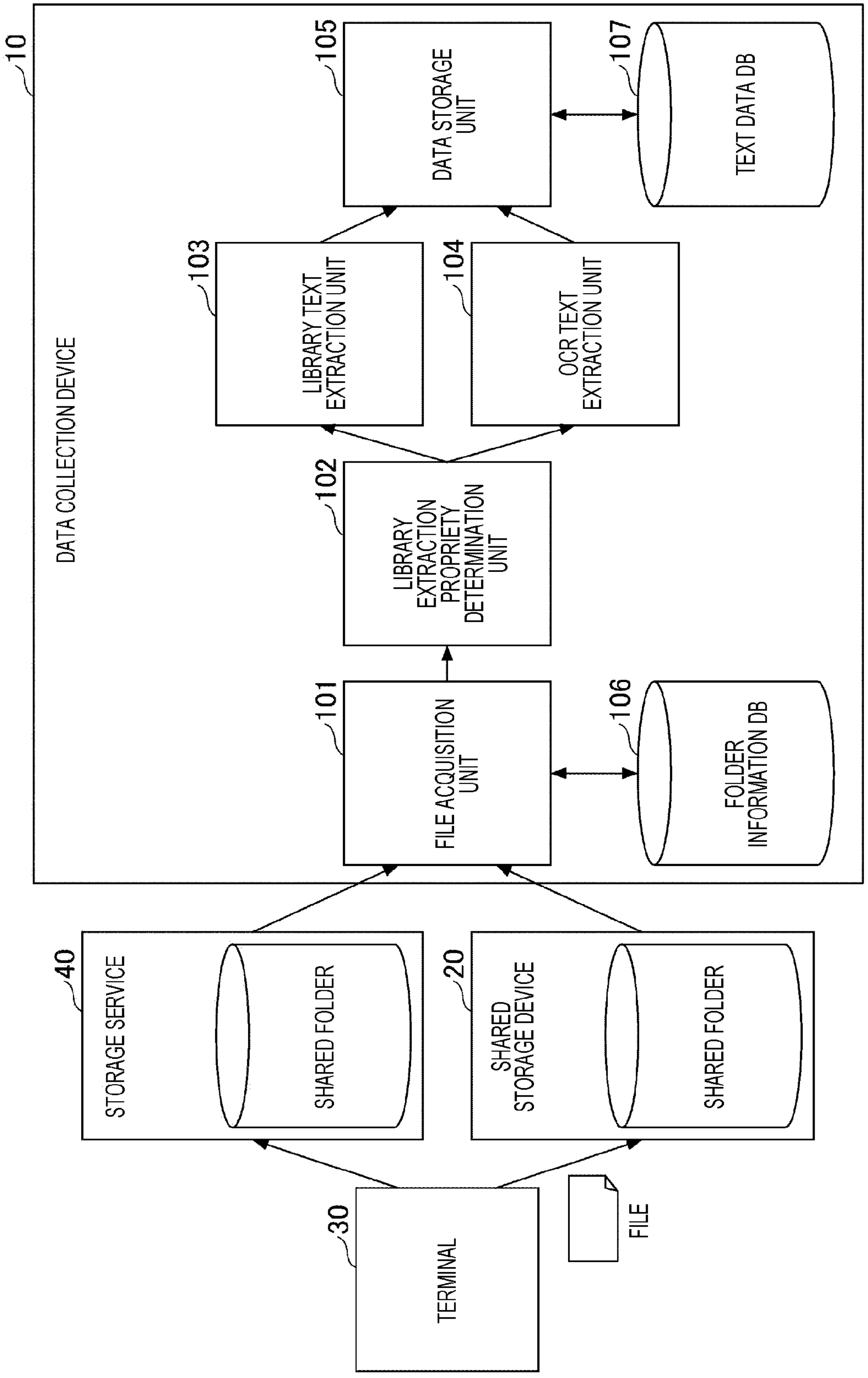
FIG. 3 is a diagram illustrating an example of a functional configuration of the data collection device according to the present embodiment.

FIG. 3 illustrates a functional configuration of the data collection device 10 according to the present embodiment. As illustrated in FIG. 3, the data collection device 10 according to the present embodiment includes a file acquisition unit 101, a library extraction propriety determination unit 102, a library text extraction unit 103, an OCR text extraction unit 104, and a data storage unit 105. These units are implemented, for example, by the processor 15 executing one or more programs installed in the data collection device 10.

Further, the data collection device 10 according to the present embodiment includes a folder information DB 106 and a text data DB 107. These databases (DBs) are implemented by an auxiliary storage device such as an HDD or an SSD, for example. However, at least one of these DBs may be implemented by a database server or the like communicatively connected to the data collection device 10.

The file acquisition unit 101 monitors a shared folder of the shared storage device 20 or the storage service 40, and acquires a file in a case where the file is uploaded to the shared folder. Here, the file acquisition unit 101 monitors a shared folder and acquires a file by using folder information stored in the folder information DB 106. The folder information is information including an address of a shared folder to be monitored and meta information (file name, size, updated date and time, etc.) of a file stored in the shared folder. In addition to the file name, the size, and the updated date and time, the meta information of the file also includes information such as a file owner, for example.

The file acquisition unit 101 acquires, for example, meta information (file name, size, updated date and time, etc.) of a file stored in a shared folder to be monitored at predetermined time intervals set in advance, and compares the meta information with meta information (file name, size, updated date and time, etc.) included in folder information of the shared folder. Then, as a result of the comparison, among the files stored in the shared folder, the file acquisition unit 101 acquires, from the shared folder, a file in which the meta information does not exist in the folder information of the shared folder or a file in which a difference occurs in the meta information. In addition, the file acquisition unit 101 updates the folder information of the shared folder among the folder information stored in the folder information DB 106 using the meta information of the file acquired from the shared folder (that is, in a case where a file is added to the shared folder, meta information is added, and in a case where a file in the shared folder is updated, meta information of the file is updated). Note that, in a case where the file in the shared folder is deleted, the file acquisition unit 101 deletes the meta information of the file from the folder information of the shared folder.

Accordingly, files uploaded to the shared folder (including a case where the file already existing in the shared folder is updated) are acquired. Further, in a case where a file is uploaded to the shared folder or in a case where a file is deleted from the shared folder, the folder information of the shared folder is updated among the folder information stored in the folder information DB 106.

For example, the file acquisition unit 101 may detect a change in the folder content of the shared folder, acquire meta information of a file stored in the shared folder in a case where the change is detected, and perform the comparison, the file acquisition, and the folder information update.

In addition, a condition of a file to be acquired may be set for the shared folder. For example, in a case where a file of a certain specific file format is not to be acquired, a condition for excluding the file format from the acquisition target may be set in the shared folder. In addition, for example, in a case where the file name includes a specific character string (for example, a character string such as "extraction prohibited"), a condition for excluding the file having the file name from the acquisition target may be set in the shared folder.

The library extraction propriety determination unit 102 analyzes the file format of the file acquired by the file acquisition unit 101, and determines whether or not the file can extract text in a specific library.

In a case where the library extraction propriety determination unit 102 determines that the file can extract the text in the specific library, the library text extraction unit 103 extracts the text of the file by the library. Note that any library can be used as the text extraction library, and any programming language or the like can be used for implementation.

In a case where the library extraction propriety determination unit 102 does not determine that the file can extract the text in the specific library, the OCR text extraction unit 104 extracts the text of the file by optical character reader (OCR). That is, the OCR text extraction unit 104 converts the file into an image file using a virtual printer or the like, and then performs OCR on the image file to extract text. This makes it possible to extract text from the file even in a file format in which there is no library for extracting the text. Any methods can be used for image conversion and OCR, and the OCR setting itself can be arbitrarily set.

Note that, in general, more accurate text extraction can be expected when text is extracted in the library than when text is extracted by OCR.

The data storage unit 105 stores data of text (text data) extracted by the library text extraction unit 103 or the OCR text extraction unit 104 in the text data DB 107. Accordingly, the text data stored in the text data DB 107 can be used as learning data for a machine learning model that implements a natural language processing task.

Here, the data storage unit 105 can store text data in the text data DB 107 at any granularity. For example, the data storage unit 105 may store text data of the entire text extracted from the file in the text data DB 107 as one entry, or may divide the text extracted from the file into N (where N is an integer of 1 or more) pieces in a predetermined unit and store N pieces of text data for each unit in the text data DB 107 as N entries. The case where N pieces of text data for each predetermined unit are stored as N entries includes, for example, a case where text extracted from a file is divided in units of paragraphs and text data for each paragraph is set as one entry, a case where the text is divided in units of sentences and text data for each sentence is set as one entry, and the like.

In addition, the data storage unit 105 may store the meta information of the file from which the text is extracted in the text data DB 107 together with the text data.

When text data is stored in the text data DB 107, in a case where the text data is extracted from a file newly added to the shared folder, the data storage unit 105 stores the text data in the text data DB 107 by newly adding an entry.

On the other hand, when text data is stored in the text data DB 107, in a case where the text data is extracted by updating a file already existing in the shared folder, the data storage unit 105 stores the text data in the text data DB 107 by replacing the already existing entry. For example, in a case where text data of the entire text extracted from the file is stored as one entry, it is only necessary for the data storage unit 105 to specify an entry to be replaced by search using a file name or the like as a key, and then perform update processing of replacing the specified entry as it is. For example, in a case where the text extracted from the file is divided in a predetermined unit and the text data in each unit is stored as one entry, it is only necessary for the data storage unit 105 to specify one or more entries by search using a file name or the like as a key, then specify an entry to be replaced from the one or more entries for each piece of text data in the unit, and perform update processing of replacing the specified entry. Any method can be employed as the method of specifying the entry to be replaced, but for example, it is conceivable to specify the entry to be replaced using a matching degree between texts or the like. Note that, in a case where the entry to be replaced cannot be specified, it is only necessary for the data storage unit 105 to add a new entry.

Furthermore, when the text data is stored in the text data DB 107, the data storage unit 105 may store (that is, it is stored as plain text) the text data as it is without processing the text data, or in a case where an input format of the machine learning model is determined, the data storage unit may store the processed text data in the format.

The folder information DB 106 stores folder information of a shared folder to be monitored. Note that any database can be used as the folder information DB 106.

The text data DB 107 stores text data (and meta information or the like of the file from which the text is extracted) stored by the data storage unit 105. Note that any database can be used as the text data DB 107, but it is preferable to use a database capable of text search. As an example, it is conceivable to use a data store such as ElasticSearch (registered trademark) having a text search function. By using a database capable of text search as the text data DB 107, the data collection device 10 can function as a search device, and for example, only text data including a certain specific character string can be acquired from the text data DB 107 as learning data.

<Flow of Data Collection Processing>

Figure 4:
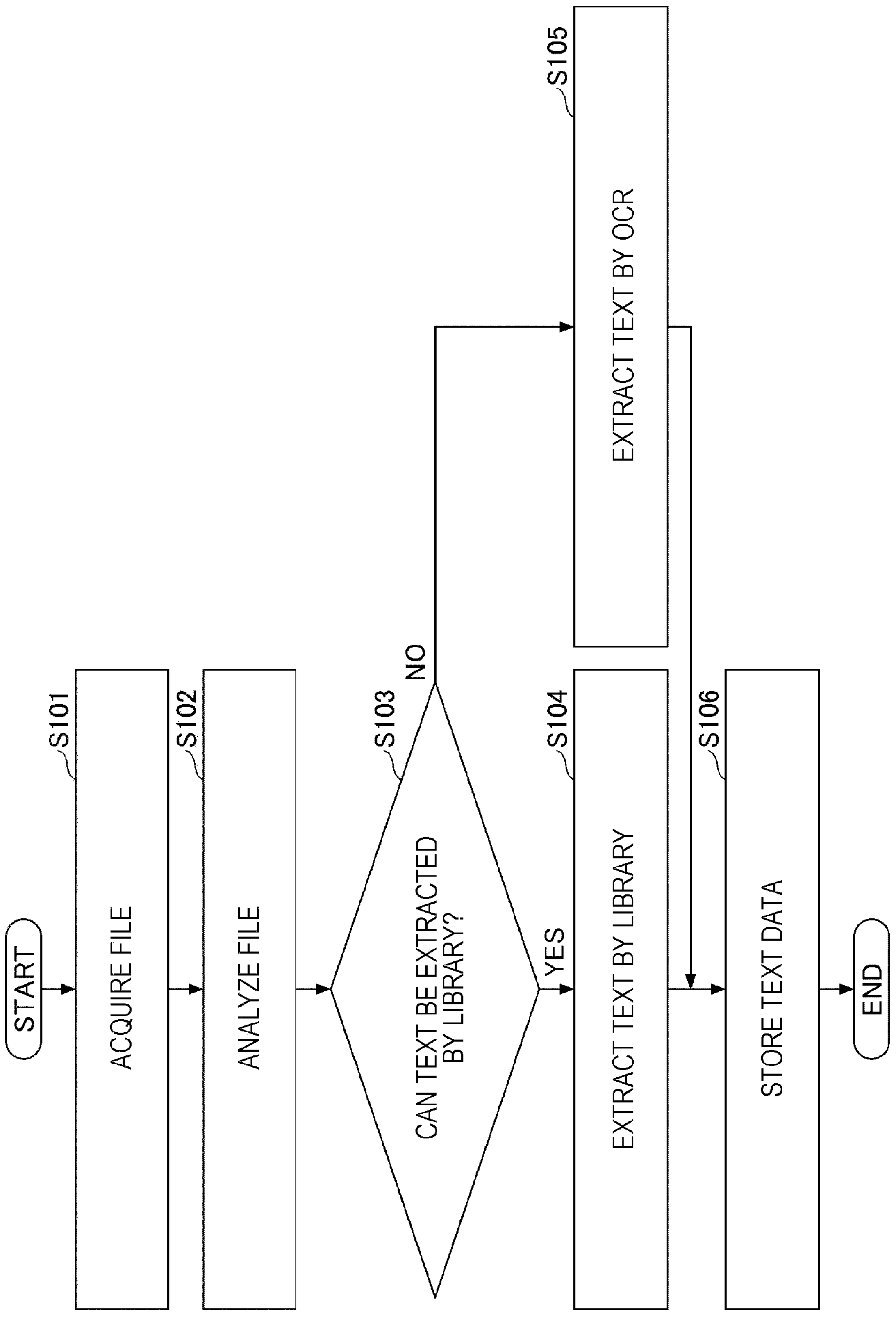
FIG. 4 is a flowchart illustrating an example of a flow of data collection processing according to the present embodiment.

FIG. 4 illustrates a flow of data collection processing according to the present embodiment.

First, the file acquisition unit 101 monitors a shared folder of the shared storage device 20 or the storage service 40 using the folder information stored in the folder information DB 106, and acquires a file in a case where the file is uploaded to the shared folder (step S101).

Next, the library extraction propriety determination unit 102 analyzes the file format of the file acquired in step S101 (step S102).

Next, the library extraction propriety determination unit 102 determines whether or not the file format analyzed in step S102 is a file format in which text can be extracted by the library (step S103). Note that, for example, a general file such as an office document file (for example, files with extensions such as ".doc" and ".xls"), a PDF file, or a hypertext markup language (HTML) file has a library which can extract text from that file, and thus the file format of such a file is determined to be a file format in which text can be extracted by the library. On the other hand, other file formats (for example, a file format such as an old office document file or a file used only for a certain specific purpose) are not determined to be file formats in which text can be extracted by the library.

In a case where it is determined in step S103 that the file format is a file format in which text can be extracted by the library, the library text extraction unit 103 extracts text from the file by the library corresponding to the file format (step S104).

On the other hand, in a case where it is not determined in step S103 that the file format is a file format in which the text can be extracted by the library, the OCR text extraction unit 104 extracts text from the file by OCR (step S105).

Then, the data storage unit 105 stores the text data of the text extracted in step S104 or step S105 in the text data DB 107 (step S106).

<Example>

An example of the present embodiment will be described below.

In the present example, a case where text extracted from a file is divided in units of paragraphs and text data for each paragraph is stored in the text data DB 107 will be described.

Figure 6:
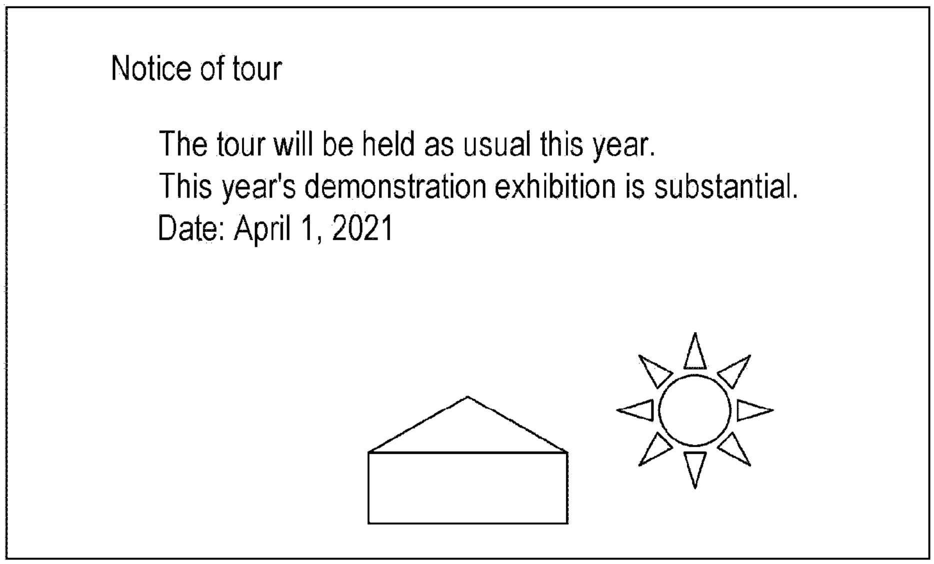
FIG. 6 is a diagram illustrating an example of a PDF file with an image.

First, in step S101 described above, it is assumed that the document file (file name "dx.doc") illustrated in FIG. 5 and the PDF file with an image (file name "poster.pdf") illustrated in FIG. 6 are acquired. Note that the document file illustrated in FIG. 5 includes text including two paragraphs, and the PDF file with an image illustrated in FIG. 6 includes text and an image including one paragraph.

At this time, FIG. 7 illustrates the text data DB 107 after executing steps S102 to S106 and storing the text data. In the example illustrated in FIG. 7, in addition to the text data, a file name, a file owner, and an updated date and time are also stored as meta information. In addition, a number for identifying an entry is also stored.

As illustrated in FIG. 7, two-entry text data is stored for the document file illustrated in FIG. 5, and one-entry text data is stored for the PDF file with an image illustrated in FIG. 6. Note that an image included in the PDF file with an image is not extracted, and only text data is stored in the text data DB 107.

<Conclusion>

As described above, the data collection device 10 according to the present embodiment extracts text from a file stored in a shared storage area (for example, a shared folder or the like) used by each terminal 30, and uses data of the extracted text as learning data for a machine learning model that implements a natural language processing task. Accordingly, the learning data for the machine learning model that implements the natural language processing task can be easily collected from the actual data, and the collection can be performed at a lower cost as compared with a case where the learning data is manually created. In addition, since the learning data is created from the actual data, it is considered that a machine learning model having high accuracy in a target task can be constructed as compared with a case where the learning data is manually created.

In addition, since file upload to a shared folder or the like is an action commonly performed in normal business, it is possible to collect learning data without causing a new burden on the user of the terminal 30. Furthermore, the file upload to a shared folder or the like is performed by the user's own decision, and a character string such as "extraction prohibited" is included in the file name, so that the text can be prevented from being extracted. Therefore, it is considered that there is no security or privacy concern for text extraction.

Note that the data collection device 10 according to the present embodiment collects the learning data for the machine learning model, but in addition to this, for example, the data collection device may have a function of constructing (learning) the machine learning model using the collected learning data and may further have a function of inferring the natural language processing task using the machine learning model.

The present invention is not limited to the above-mentioned specifically disclosed embodiment, and various modifications and changes, combinations with known technique, and the like can be made without departing from the scope of the claims.

REFERENCE SIGNS LIST

1 Data collection system
10 Data collection device
11 Input device
12 Display device
13 External I/F
13*a* Recording medium
14 Communication I/F
15 Processor
16 Memory device
17 Bus
20 Shared storage device
30 Terminal
40 Storage service
101 File acquisition unit
102 Library extraction propriety determination unit
103 Library text extraction unit
104 OCR text extraction unit
105 Data storage unit
106 Folder information DB
107 Text data DB
N1 Local area network
N2 Internet

The invention claimed is:

1. A data collection device comprising a processor configured to execute operations comprising:

acquiring data from a shared memory in response to receiving a notification about the data stored in the shared memory, wherein the shared memory is accessible by one or more users, and the shared memory comprises a condition for extracting data, and the shared memory comprises at least one of a shared folder of a storage existing in a local area network or a shared folder of an external storage available via the Internet;

determining the acquired data being in a predetermined data format, wherein the predetermined data format represents a format in which text included in the data is extractable by executing a predetermined library of computer-executables for extracting text;

extracting, by the processor executing the predetermined library, the text included in the data by a text extraction operation according to the determined data in the predetermined data format to automatically create at least a part of learning data for training a machine learning model, wherein the predetermined library is distinct from the machine learning model, and the extracting further comprises:

when the result of the determining indicates that the format of the data is the format in which the text included in the data is extractable by a predetermined library, extracting the text included in the data by the library, and when the result of the determining indicates that the format of the data is not the format in which the text included in the data is extractable by a predetermined library, extracting the text included in the data by optical character recognition;

storing the extracted text as the learning data in a database, wherein the storing further comprises processing the text into an input format of the machine learning model, and storing the processed text in the database as the learning data;

acquiring subsequent data from the shared memory, wherein the subsequent data comprises a subsequent text and meta information, wherein the acquiring excludes, based at least on the meta information, the subsequent text from extracting and storing in the database, wherein the meta information indicates prohibiting the extraction of the subsequent text, and the meta information satisfies the condition of the shared memory;

automatically creating a plurality of paragraphs as the learning data by dividing the extracted text into the plurality of paragraphs, wherein the condition comprises a paragraph as a predetermined unit of the learning data; and training, based on the automatically created at least the part of the learning data, the machine learning model and performing, by the machine learning model, a task of processing a natural language input.

2. The data collection device according to claim 1, wherein the storing further comprises dividing the text into predetermined units, and storing each piece of the divided text in the database as the learning data.

3. The data collection device according to claim 1, wherein the database comprises a data store having a search function for the text.

4. A computer implemented method for collecting data, comprising:

acquiring data from a shared memory in response to receiving a notification about the data stored in the shared memory, wherein the shared memory is accessible by one or more users, and the shared memory comprises a condition for extracting data, and the shared storage area comprises at least one of a shared folder of a storage existing in a local area network or a shared folder of an external storage available via the Internet;

determining the acquired data being in a predetermined data format, wherein the predetermined data format represents a format in which text included in the data is extractable by a predetermined library of computer-executables for extracting text;

extracting, by the processor executing the predetermined library, the text included in the data by a text extraction operation according to the determined data in the predetermined data format to automatically create at least a part of learning data for training a machine learning model, wherein the predetermined library is distinct from the machine learning model, and the extracting further comprises:

when the result of the determining indicates that the format of the data is the format in which the text included in the data is extractable by a predetermined library, extracting the text included in the data by the library, and when the result of the determining indicates that the format of the data is not the format in which the text included in the data is extractable by a predetermined library, extracting the text included in the data by optical character recognition;

storing the extracted text as the learning data in a database, wherein the storing further comprises processing the text into an input format of the machine learning model and storing the processed text in the database as the learning data;

acquiring subsequent data from the shared memory, wherein the subsequent data comprises a subsequent text and meta information, wherein the acquiring excludes, based at least on the meta information, the subsequent text from extracting and storing in the database, wherein the meta information indicates prohibiting the extraction of the subsequent text, and the meta information satisfies the condition of the shared memory;

automatically creating a plurality of paragraphs as the learning data by dividing the extracted text into the plurality of paragraphs, wherein the condition comprises a paragraph as a predetermined unit of the learning data; and training, based on the automatically created at least the part of the learning data, the machine learning model and performing, by the machine learning model, a task of processing a natural language input.

5. The computer implemented method according to claim 4, wherein the storing further comprises dividing the text into predetermined units, and storing each piece of the divided text in the database as the learning data.

6. The computer implemented method according to claim 4, wherein the database comprises a data store having a search function for the text.

7. A computer-readable non-transitory recording medium storing a computer-executable program instructions that when executed by a processor cause a computer to execute operations comprising:

acquiring data from a shared memory in response to receiving a notification about the data stored in the shared memory, wherein the shared memory is accessible by one or more users, and the shared memory comprises a condition for extracting data, and the shared memory comprises at least one of a shared folder of a storage existing in a local area network or a shared folder of an external storage available via the Internet;

determining the acquired data being in a predetermined data format, wherein the predetermined data format represents a format in which text included in the data is extractable by executing a predetermined library of computer-executables for extracting text;

extracting, by the processor executing the predetermined library, the text included in the data by a text extraction operation according to the determined data in the predetermined data format to automatically create at least a part of learning data for training a machine learning model, wherein the predetermined library is distinct from the machine learning model, and the extracting further comprises:

when the result of the determining indicates that the format of the data is the format in which the text included in the data is extractable by a predetermined library, extracting the text included in the data by the library, and when the result of the determining indicates that the format of the data is not the format in which the text included in the data is extractable by a predetermined library, extracting the text included in the data by optical character recognition;

storing the extracted text as the learning data in a database, wherein the storing further comprises processing the text into an input format of the machine learning model, and storing the processed text in the database as the learning data;

acquiring subsequent data from the shared memory, wherein the subsequent data comprises a subsequent text and meta information, wherein the acquiring excludes, based at least on the meta information, the subsequent text from extracting and storing in the database, wherein the meta information indicates prohibiting the extraction of the subsequent text, and the meta information satisfies the condition of the shared memory;

automatically creating a plurality of paragraphs as the learning data by dividing the extracted text into the plurality of paragraphs, wherein the condition comprises a paragraph as a predetermined unit of the learning data; and training, based on the automatically created at least the part of the learning data, the machine learning model and performing, by the machine learning model, a task of processing a natural language input.

8. The computer-readable non-transitory recording medium according to claim 7, wherein the storing further comprises dividing the text into predetermined units, and storing each piece of the divided text in the database as the learning data.

9. The computer-readable non-transitory recording medium according to claim 7, wherein the database comprises a data store having a search function for the text.

* * * * *